United States Patent [19]
Faulk

[11] Patent Number: 5,568,825
[45] Date of Patent: Oct. 29, 1996

[54] AUTOMATIC LEAK DETECTION AND SHUT-OFF SYSTEM

[76] Inventor: John W. Faulk, 1111 Wards Pl., Jacksonville, Fla. 32259

[21] Appl. No.: 570,618

[22] Filed: Dec. 11, 1995

[51] Int. Cl.⁶ ............................... F17D 3/01; E03B 7/04
[52] U.S. Cl. .................... 137/624.11; 137/486; 137/552; 137/614.2
[58] Field of Search .................... 137/624.11, 624.12, 137/486, 487.5, 552.7, 557, 511, 614.2, 552

[56] References Cited

U.S. PATENT DOCUMENTS

| | | | |
|---|---|---|---|
| 4,180,088 | 12/1979 | Mallett | 137/487.5 X |
| 4,589,435 | 5/1986 | Aldrich | 137/624.11 X |
| 4,735,231 | 4/1988 | Jacquet | 137/487.5 X |
| 5,004,014 | 4/1991 | Bender | 137/487.5 X |
| 5,056,554 | 10/1991 | White | 137/624.11 X |
| 5,251,653 | 10/1993 | Tucker et al. | 137/487.5 X |
| 5,409,037 | 4/1995 | Wheeler et al. | 137/487.5 X |
| 5,441,070 | 8/1995 | Thompson | 137/624.11 X |

*Primary Examiner*—Kevin Lee
*Attorney, Agent, or Firm*—Thomas C. Saitta

[57] ABSTRACT

A system for detecting leakage and unwanted flow in a fluid supply within a building capable of detecting small leaks and shutting off flow when such occur. The system may be operated in a continuous mode or on a timed mode, and the system allows flow for a preset small time period before the shut-off is initiated. The system includes an inflow sensor, a discharge sensor and valve means to seal the supply conduit in the event of unwanted fluid flow or backflow in the discharge conduit. The system is extremely sensitive due to the provision of a by-pass conduit around a check-valve in the supply conduit, where the flow sensor is positioned in the by-pass conduit, such that small volume water flow must pass through the flow sensor.

8 Claims, 2 Drawing Sheets

AUTOMATIC LEAK DETECTION AND SHUT-OFF SYSTEM

BACKGROUND OF THE INVENTION

The invention relates generally to a system for detecting leaks or unwanted liquid flow in a fluid supply system, such as the plumbing system of a house or building, and means to automatically preclude fluid flow to prevent damage to the structure. More particularly, the invention relates to such a system which is capable of detecting very small volumes of fluid flow, is capable of overriding the shut-off means for a limited time period to allow short term usage of the fluid supply system, and also prevents damage from backflow from the outflow conduit of the fluid system by providing an audible alarm and shutting down any inflow of fluid.

In any building with a fluid supply system, there is a constant danger of damage to the building from failure of the fluid supply system. Houses and most buildings have supply conduits to bring water into the building, a large number of internal conduits to deliver the water to outlets and appliances, a number of internal conduits to remove waste water, and a discharge conduit to deliver the waste water to the sewer system or a septic tank. Any of these fluid supply components can fail, resulting in small or large leaks, and the appliances which use water can also fail and release water into the building. Additionally, a clogged discharge conduit or flood conditions can cause water to back up into the building and overflow toilets or sinks. The amount of damage caused by a fluid system failure is directly proportional to the amount of water flow and the length of time before the failure is detected. If a building is occupied, then an alarm may be sufficient, but an alarm alone still requires the occupant to manually shut down the inflow of water. If a building is not occupied, then an alarm alone is completely inadequate and an automatic water shut-off system is required to prevent what can be extensive damage from even a small leak allowed to flow uninterrupted for a long time period.

Systems have been developed to address some or all of these problems, but none have provided adequate solutions for all possible scenarios in a system which is relatively easy to operate and inexpensive to install. The use in general of flow detectors, shut-off valves and alarms is well known, but previous systems have numerous drawbacks. Furthermore, it is most desirable to provide a system which operates automatically to shut down all inflow of water in a leak situation, even where the leak is very small, but which provides an override to allow for minimal or automatic water usage, such as for hand washing, toilet flushing or refill of an automatic icemaker, without causing activation of the shut-off mechanism.

Examples of prior systems include U.S. Pat. No. 5,004, 014 to Bender, U.S. Pat. No. 5,251,653 to Tucker et al., and U.S. Pat. No. 5,409,037 to Wheeler et al. The Bender device is primarily a water use control system, in that the system times water usage and shuts it down after a preset period of time, after which the system must be reset to allow water flow again for the preset period of time. This is not effective protection against pipe failure, in that the system may be (and most likely will be) preset to allow for long periods of water flow, which would be required for washing machines, dish washers, showers, etc. The Tucker device is not useful to detect small leaks, in that it utilizes a flow rate measurement to initiate shut-down with an allowable minimum flow rate to allow icemaker operation. Additionally, this system does not allow for short term regular flow, such as would occur with flushing a toilet. Such an event would trigger the system and shut down all water flow. The Wheeler system is another timer system and is defective in that it will allow a significant amount of water flow prior to deactivating the system.

It is an object of this invention to provide an automatic leak detection and fluid flow shut-off system which is capable of detecting extremely low flow amounts, preventing inflow from the supply conduit when activated, detecting backflow from the discharge conduit, and activating an audible alarm when excessive flow is detected. It is a further object to provide such a system which can be programmed to be operative and non-operative for specific time periods and days. It is a further object to provide such a system which can be programmed to allow flow for a given time period before activation of the alarm and shut-off means for such things as refill of an automatic ice maker, flushing a toilet, washing hands or getting a drink of water.

SUMMARY OF THE INVENTION

The invention is a system for automatic leak detection, alarm and fluid flow shut-off to prevent damage to a building. The system is incorporated into and monitors fluid flow within the supply conduit bringing water to the building as well as backflow within the discharge conduit removing waste water from the building. The system comprises in general flow sensor means positioned within the main water supply conduit, shut-off valve means positioned within the main water supply conduit, backflow sensor means positioned within the waste water discharge conduit, and programmable control means to operate the entire system. The control means comprises means to activate or deactivate the system, means to operate the shut-off valve means and alarm means in response to activation signals from the flow or backflow sensor means, means to set periodic time segments for the system to be activated and deactivated, and means to allow water flow for a predetermined short time period, up to approximately 1 minute or longer, even when the system is activated.

The inflow sensor is sensitive to relatively small fluid flow volume, such that the sensor will be activated immediately at any flow rate in excess of approximately 0.05 ounces per second, a flow rate roughly equivalent to a pin-hole size leak in a water supply conduit. To provide such a sensitive sensor in an inexpensive manner, a by-pass conduit containing the flow sensor device is utilized in conjunction with a pressure-operated check-valve mounted into the main supply conduit, whereby the check-valve remains in the closed position and diverts all water flow through the by-pass conduit until water usage is initiated in the building in an amount in excess of the minimum flow rate detectable by the flow sensor device and the capacity of the by-pass conduit, thereby causing the check-valve to open. The small diameter by-pass conduit containing the flow sensor means is connected to the main flow conduit upstream and downstream of the check-valve, the by-pass conduit having a much smaller diameter, such as ¼ inch for a ¾ inch main conduit. When normal water usage is initiated within the building, water will flow through both the check-valve and the flow sensor. Unless the system is deactivated or usage is less than the preset override time limit, the system will be activated and inflow of water will be halted. When no normal water demand is made and the check-valve is closed, any small leakage amount will be insufficient to open the check-valve but will draw water through the restricted flow conduit and through the flow sensor, thereby activating the system and shutting off the inflow.

To utilize the system, the user activates the control means for either continuous or periodic operation. For periodic operation, activation/deactivation time periods are chosen using a 24 hour/7 day timer, or similar device, in the control means. For example, a home user may set the system to be operative from 8 AM to 6 PM, the hours when the home is unoccupied. The user could also set the system to be operative during sleep hours as well. The continuous setting would be used when a home or building was to be unoccupied for long time periods. The user also sets the override time period for a short length of time, from a few seconds to up to 10 minutes, to allow water flow for appliance usage or quick water needs (ice maker, toilet, etc.) without activating the shut-off valve. When operational, the system immediately detects any flow equal to a rate greater than approximately 3 ounces per minute. If this flow continues beyond the preset override time period, the control means activates the shut-off valve, preventing any additional water from entering the building. The backflow detection and alarm portion of the system remains in operation continuously, even when the remainder of the system is deactivated. If the water level in the discharge conduit rises due to backflow, the sensor relays this information to the control means, which activates the alarm and the shut-off valve positioned in the supply conduit. This prevents any additional water from being delivered to the discharge conduit until the problem is corrected.

DETAILED DESCRIPTION OF THE INVENTION

Figure 1:
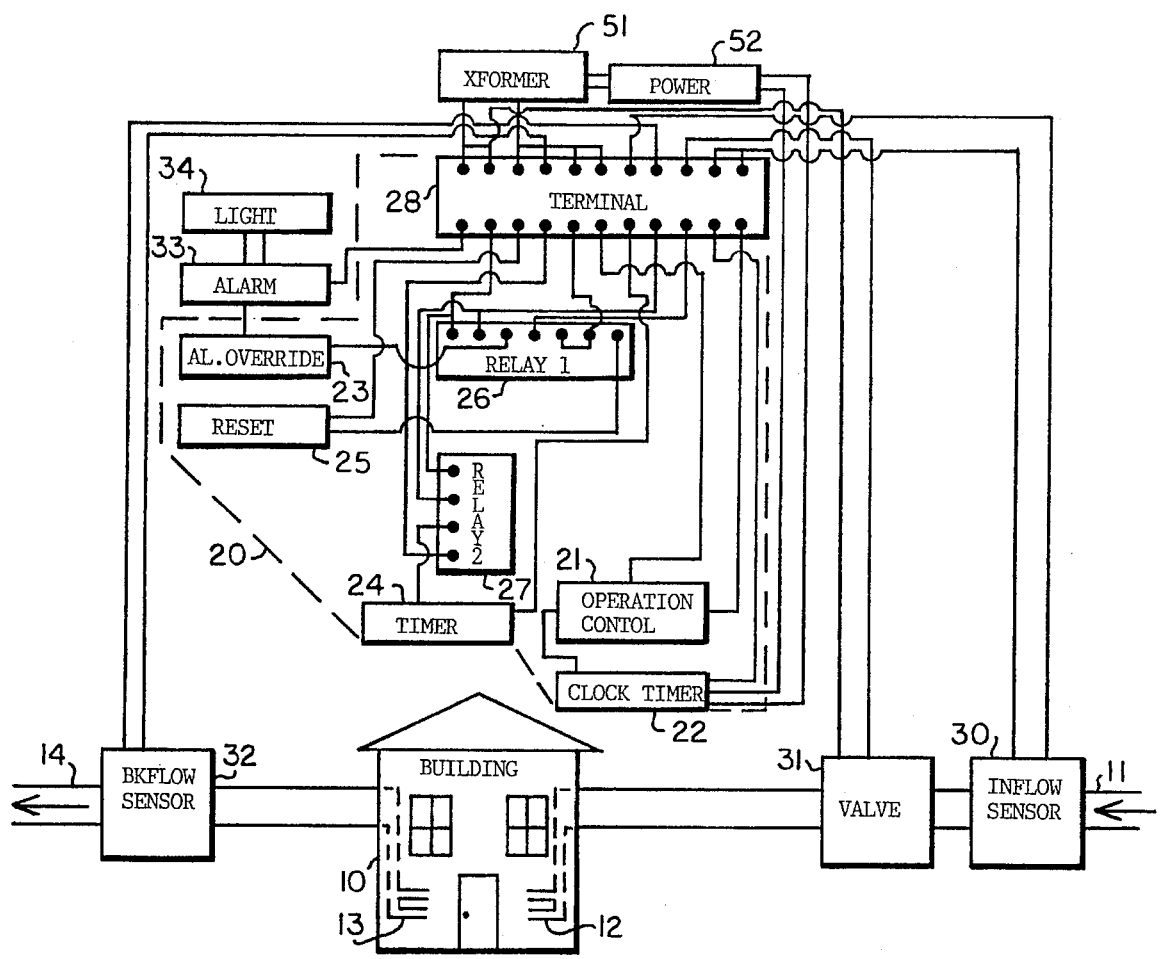
FIG. 1 is a schematic representation of the invention.

With reference to the accompanying drawings, the invention will now be described in detail with regard to the best mode and preferred embodiment. In general, the invention is an automatic leak detection and flow shut-off system for use in combination with fluid supply systems found in buildings and homes. A typical fluid supply system is a water delivery and removal system comprising an external main supply conduit 11 for delivering water from a main water supply source into a building 10, internal supply conduits 12 to deliver water to appliances or outlets within the building 10, internal discharge conduits 13 for removing waste water from the various outlets and appliances, and an external main discharge conduit 14 delivering the waste water to the main sewer system or a septic tank. The invention is adapted to be incorporated into various portions of this fluid supply system, whereby when the system of the invention is operational, any water flow occurring for longer than a predetermined short time period results in closure of the main water supply conduit 11 and preferably an audible or visible alarm. Additionally, the waste water discharge conduit 14 is continuously monitored, and any backflow or water build-up in the discharge conduit 14 also results in the audible alarm and closure of the main water supply conduit 11. The system of the invention is operational in a continuous on mode or a timed periodic mode, where both the water supply conduit 11 and the waste water discharge conduit 14 are monitored, or in an off mode where only the waste water discharge conduit 14 is monitored.

As seen in FIG. 1, the automatic leak detection and flow control system comprises in general programmable control means 20 which is electrically powered with a battery back-up for periods of power outage, inflow sensor means 30 to detect flow of water through supply conduit 11, valve means 31 to close supply conduit 11 and prevent flow of water into building 10, and backflow sensor means 32 to detect water build-up or backflow in discharge conduit 14. The inflow sensor means 30, backflow sensor means 32 and flow valve means 31 are electrically connected to control means 20, such that a signal from inflow sensor means 30 indicating water flow in supply conduit 11 when the system is activated, where such flow is for a time period exceeding a maximum preset flow window, or a signal from backflow sensor means 32 at any time, results in operation of valve means 31 to block supply conduit 11 as well as activation of an audible alarm means 33 and optionally a visible indicator means 34.

The inflow sensor means 30 can be of any type known sensor capable of detecting relatively low fluid flow amounts within supply conduit 11 and delivering a signal to control means 20. Inflow sensor means 30 may be externally mounted onto supply conduit 11 for non-flow through sensors and internally mounted for flow through sensors. It is preferable that inflow sensor means 30 be capable of detecting flow rates as low as 0.05 ounces per second, a flow rate equivalent to a pin-hole size leak. This insures that even relatively small leaks will be detected and all incoming water flow stopped, since even small leaks can cause extensive damage if uncorrected for long time periods of hours, days or weeks. The backflow sensor means 32 can be of any type known sensor capable of detecting water backflow or build-up within discharge conduit 14, including flow type or float type sensors, and delivering a signal to control means 20. The valve means 31 is incorporated into the main supply conduit 31 and may be of any known type valve, such as a solenoid valve, operational by electrical signal from the control means 20, which when activated completely seals off supply conduit 11 such that no water can flow into building 10.

The control means 20 receives power from a transformer 51 connected to the electrical power supply 52 of the building 10. The control means 20 is programmable to operate the system on a periodic timer mode with preset activated and deactivated time periods, as well as in a continuous on mode or off mode. The control means 20 is also programmable to set a timed override period to allow water flow for a given period of time without activation of the alarm means 33 and shut off valve means 31. The control means 20 preferably comprises in general, all connected in proper electrical circuit, operation control switch means 21, selectable clock timer means 22, alarm override means 23, selectable override timer means 24, and a system reset means 25, along with a first relay 26, a second relay 27 and terminal connector 28, or like elements, for electrical connection purposes. The clock timer means 22 is directly connected to power supply means 52 to remain operational even when the system is deactivated and includes a back-up battery to operate the clock function during periods of power outage. The backflow sensor means 32 and flow valve shut-off means 31 are also continuously powered so as to remain operational in the off mode or during the deactivation period of the timed periodic mode.

The operation control switch means 21 provides for three operational settings. This first is the off mode, in which the inflow sensor 30 is deactivated and incoming water flow into the building 10 is not monitored. In this setting, all normal water usage functions can be carried out. This setting is selected when the building 10 is occupied, high water usage is expected and the system does not need to be in operation. As discussed above, the backflow sensor means 32 and valve means 31 are still operational in the off mode, to prevent delivery of waste water into the discharge conduit 14 if that conduit is clogged or flooded, thus precluding inadvertent flooding of the building 10. A second setting is the on or continuous mode, in which the system is operational continuously. Both sensors 30 and 32 are operational in this setting, as is valve means 31. The on mode is selected when the building is to be unoccupied for a long time period and continuous protection is desired. The third setting for the operation control switch means 21 is the timed or periodic mode, in which the system is activated for one or more chosen time periods on a daily basis. Clock timer means 22, of any suitable type known in the art, is programmable to activate the system during selected segments of time on a periodic basis, preferably covering 7 days and 24 hours. For example, the user can program clock timer means 22 on a daily basis Monday through Friday to activate the system at 6 PM when a commercial building 10 closes and deactivate the system at 7 AM when the building 10 reopens, with 24 hour operation on the weekend. As another example, a residential user can program clock timer means 22 to activate the system Monday through Friday at 7 AM when leaving for work, deactivate at 6 PM when returning home, activate at midnight when going to sleep and deactivate at 6 AM when waking, with only the midnight to 6 AM activation period on the weekend.

The override timer means 24 is a means to provide a short operational time period in which water flow is allowed even when the system is activated. Override timer means 24 is any suitable programmable device capable of preventing operation of the alarm means 33 and valve means 31 until after water flow is detected by inflow sensor means 30 for a period in excess of a predetermined short time, such as for example up to 10 minutes, but preferably set at approximately one minute. This function allows short term water flow even when the system is activated, in order that continuously operational appliances such as ice makers do not trigger the alarm and shut-down scenario, as well as allowing any occupants of the building to utilize small water volumes for flushing and refilling the toilet, washing hands, brushing teeth, getting a drink, etc. This is especially useful in the home setting when the system is activated during sleep hours.

Preferably, the system also includes alarm override means 23, which allows the user to stop the audible alarm once the user has responded, and system reset means 25 to reactivate the system after the problem has been corrected.

Figure 2:
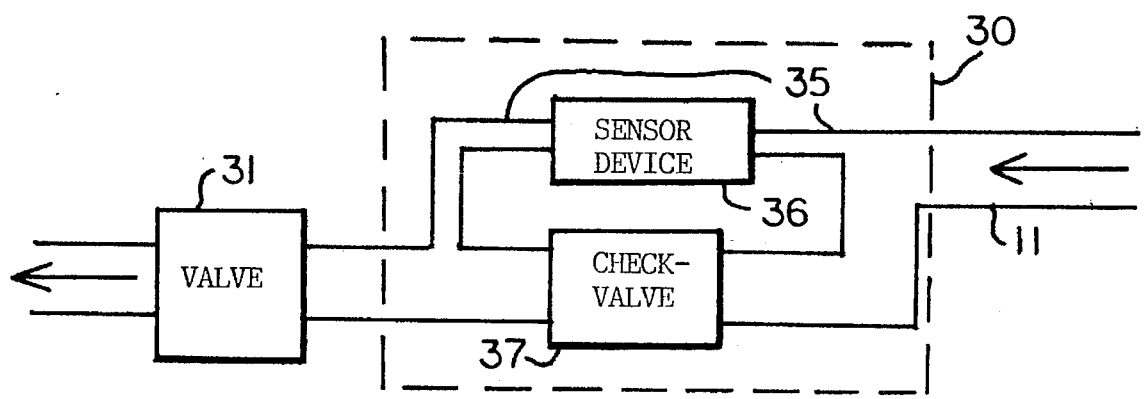
FIG. 2 is a view of a portion of the fluid supply conduit showing the preferred embodiment of the flow sensor bypass conduit combined with a check-valve.

While the system is operational with any suitable low volume flow sensor means, it is difficult to incorporate a low volume sensor means into a large volume conduit which can adequately detect very small flow rates. If a small diameter by-pass conduit is used where flow through the main conduit is partially restricted to divert some water through the by-pass conduit and flow sensor means, the water will take the path of least resistance when a small volume leak occurs and flow only through the main conduit, such that the low volume sensor will not detect the flow caused by the small leak. Flow sensors capable of detecting flow rates as low as 0.05 ounces per second in a main conduit would be prohibitively expensive and subject to erroneous readings. In the preferred system as shown in FIG. 2, a special arrangement is provided which allows a generally inexpensive, low volume flow sensor means 30 to be utilized, such as an Erecta model #5-21 straight flow piston type. In this embodiment, flow sensor means 30 comprises a small volume by-pass conduit 35, sized at approximately ⅓ or less the diameter of the supply conduit 11, a small volume sensor device 36 and check-valve means 37. The by-pass conduit 35 provides a water conduit from a point upstream of check-valve means 37 to a point downstream of check-valve means 37. Check-valve means 37 is any suitable one way valve which remains closed until a threshold water flow pressure is encountered, at which time it opens fully to allow unimpeded flow. For example, check-valve means 37 can be a biased or spring-type valve which remains closed until the pressure is sufficient to overcome the resistance of the biasing member. The threshold value for opening the check-valve means 37 must be greater than the minimum flow rate detectable by the sensing device 36. For a sensor device capable of detecting 0.05 ounces per second and thereupon activating the system, the check-valve remains closed until the flow rate exceeds this value. In application, the check-valve 37 will remain closed until the flow capacity of the by-pass conduit 35 is exceeded and the pressure within the supply conduit 11 exceeds the threshold pressure value necessary to open check-valve 37, since up to this level the water will take the path of least resistance through the by-pass conduit 35. In this manner, a small leak will not provide sufficient pressure to open check valve 37 and, since the main flow path is blocked by the check-valve 37, the water will flow through the by-pass conduit 35 where it is detected by the sensor device 36 and the system is activated. When large volume flow occurs, the capacity of the by-pass conduit 35 is exceeded, pressure in the supply conduit rises above the threshold value needed to open check-valve 37, and the flow is through both the now-open check-valve 37 and the flow sensor device 36, meaning that if the system is in either the on mode or an active period of the timed periodic mode, and the preset override period is exceeded, the system will shut-off flow through the supply conduit 11 and activate the alarm means 33. Thus the system will detect both small volume and large volume leaks.

It is understood that substitutions and equivalents may be obvious to those skilled in the art, and the true scope and definition of the invention therefore is to be as set forth below.

I claim:

1. A system for detecting leaks or unwanted flow in a water supply system for a building having a supply conduit and a discharge conduit, and for preventing inflow of water when a leak is detected, comprising:

(A) flow sensor means incorporated into the supply conduit of the water supply system to detect flow within said supply conduit and relay signals to a control means, said flow sensor means capable of detecting flow rates as low as 0.05 ounces per second, (B) valve means incorporated into the supply conduit of the water supply system, said valve means capable of completely sealing said supply conduit to prevent flow of water through said supply conduit, (C) control means to operate said valve means and seal said supply conduit in response to signals received from said flow sensor means, said control means comprising override timer means to provide a preset time period, whereby said control means operates said valve means to seal said supply conduit only when flow is detected by said flow sensor means for a period of time in excess of said preset time period, and (D) backflow sensor means incorporated into the discharge conduit of the water supply system to detect backflow within said discharge conduit and relay signals to said control means, whereby said control means operates said valve means and seals said supply conduit in response to signals received from said backflow sensor means.

2. The system of claim 1, where said flow sensor means comprises a check-valve incorporated into said supply conduit, a by-pass conduit connected to the supply conduit upstream of said check-valve and downstream of said check-valve, and a low volume flow sensor device incorporated into said by-pass conduit, whereby said check-valve seals said supply conduit and diverts all water flow through said by-pass conduit until a flow rate in excess of 0.05 ounces per second occurs.

3. The system of claim 1, where said flow sensor means comprises a check-valve incorporated into said supply conduit, a by-pass conduit connected to the supply conduit upstream of said check-valve and downstream of said check-valve, and a low volume flow sensor device incorporated into said by-pass conduit, said check-valve having a threshold pressure value to open said check-valve which is greater than the minimum flow rate detectable by said low volume flow sensor device, whereby said check-valve seals said supply conduit and diverts all water flow through said by-pass conduit until the flow capacity of the by-pass conduit is exceeded and the pressure within the supply conduit becomes sufficient to open said check-valve.

4. The system of claim 1, where said control means further comprises operation control means to operate said system in an off mode, a continuous on mode or a timed mode, and further where said backflow sensor means and said valve means remain operational in all modes.

5. A system for detecting leaks or unwanted flow in a water supply system for a building having a supply conduit and a discharge conduit, and for preventing inflow of water when a leak is detected, comprising:

(A) flow sensor means incorporated into the supply conduit of the water supply system to detect flow within said supply conduit and relay signals to a control means, said flow sensor means capable of detecting flow rates as low as 0.05 ounces per second, (B) valve means incorporated into the supply conduit of the water supply system, said valve means capable of completely sealing said supply conduit to prevent flow of water through said supply conduit, and (C) control means to operate said valve means and seal said supply conduit in response to signals received from said flow sensor means, said control means comprising override timer means to provide a preset time period, whereby said control means operates said valve means to seal said supply conduit only when flow is detected by said flow sensor means for a period of time in excess of said preset time period, where said flow sensor means comprises a check-valve incorporated into said supply conduit, a by-pass conduit connected to the supply conduit upstream of said check-valve and downstream of said check-valve, and a low volume flow sensor device incorporated into said by-pass conduit, whereby said check-valve seals said supply conduit and diverts all water flow through said by-pass conduit until a flow rate in excess of 0.05 ounces per second occurs.

6. The system of claim 5, where said control means further comprises operation control means to operate said system in an off mode, a continuous on mode or a timed mode, and further where said backflow sensor means and said valve means remain operational in all modes.

7. A system for detecting leaks or unwanted flow in a water supply system for a building having a supply conduit and a discharge conduit, and for preventing inflow of water when a leak is detected, comprising:

(A) flow sensor means incorporated into the supply conduit of the water supply system to detect flow within said supply conduit and relay signals to a control means, said flow sensor means capable of detecting flow rates as low as 0.05 ounces per second, (B) valve means incorporated into the supply conduit of the water supply system, said valve means capable of completely sealing said supply conduit to prevent flow of water through said supply conduit, and (C) control means to operate said valve means and seal said supply conduit in response to signals received from said flow sensor means, said control means comprising override timer means to provide a preset time period, whereby said control means operates said valve means to seal said supply conduit only when flow is detected by said flow sensor means for a period of time in excess of said preset time period, where said flow sensor means comprises a check-valve incorporated into said supply conduit, a by-pass conduit connected to the supply conduit upstream of said check-valve and downstream of said check-valve, and a low volume flow sensor device incorporated into said by-pass conduit, said check-valve having a threshold pressure value to open said check-valve which is greater than the minimum flow rate detectable by said low volume flow sensor device, whereby said check-valve seals said supply conduit and diverts all water flow through said by-pass conduit until the flow capacity of the by-pass conduit is exceeded and the pressure within the supply conduit becomes sufficient to open said check-valve.

8. The system of claim 7, where said control means further comprises operation control means to operate said system in an off mode, a continuous on mode or a timed mode, and further where said backflow sensor means and said valve means remain operational in all modes.

\* \* \* \* \*